United States Patent [19]

Angevine et al.

[11] 4,417,973
[45] Nov. 29, 1983

[54] UPGRADING OLEFINIC STOCKS VIA SEQUENTIAL HYDROFORMYLATION/HYDROGENATION

[75] Inventors: Philip J. Angevine, West Deptford; Chiu T. Lam, Sewell, both of N.J.

[73] Assignee: Mobil Oil Corporation, New York, N.Y.

[21] Appl. No.: 415,284

[22] Filed: Sep. 7, 1982

[51] Int. Cl.³ .............................................. C10G 1/00
[52] U.S. Cl. .................................. 208/46; 568/909; 585/733
[58] Field of Search ..................... 208/46; 568/909; 585/733

[56] References Cited

U.S. PATENT DOCUMENTS

| | | | |
|---|---|---|---|
| 3,501,546 | 3/1970 | Dubeck et al. | 585/733 |
| 4,039,585 | 8/1977 | Homeier | 568/909 |
| 4,181,597 | 1/1980 | Yam et al. | 208/46 |
| 4,208,268 | 6/1980 | Sato et al. | 208/46 |
| 4,351,646 | 9/1982 | Frost et al. | 585/733 |

Primary Examiner—Curtis R. Davis
Attorney, Agent, or Firm—Alexander J. McKillop; Michael G. Gilman; Howard M. Flourney

[57] ABSTRACT

A process is provided wherein synthesis gas ($H_2$+CO) is used to convert olefins to methylated saturates embodying hydroformylation followed by hydrogenation. Suitable feedstocks include FCC light cycle oil, catalytically dewaxed products, coker liquids, shale oil and pyrolysis gasoline.

11 Claims, 1 Drawing Figure

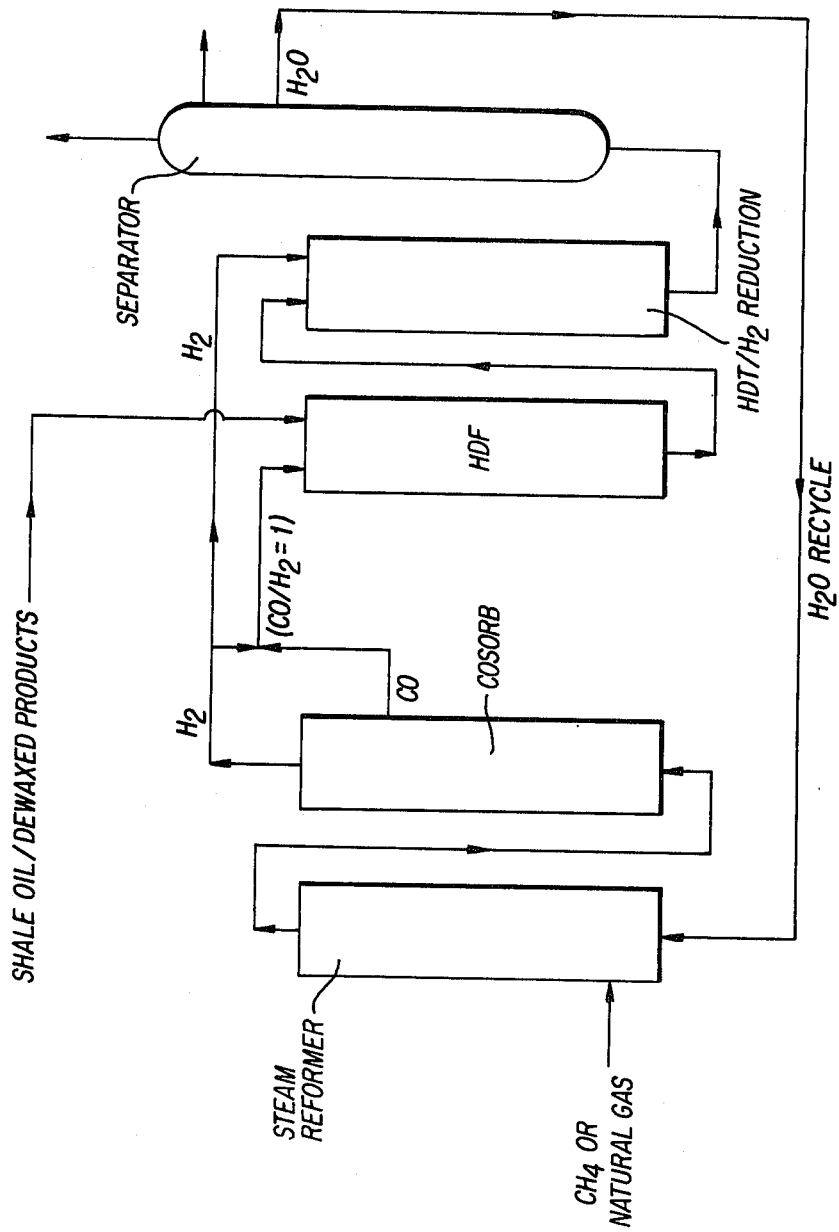

UPGRADING OLEFINIC STOCKS VIA SEQUENTIAL HYDROFORMYLATION/HYDROGENATION

BACKGROUND OF THE INVENTION

1. Field of the Invention

The present invention is directed to a process for the upgrading of olefinic stocks by sequential hydroformylation (HDF) and hydrogenation. Suitable feedstocks include FCC light cycle oil, products from distillate dewaxing, lube dewaxing, coker liquids, shale oil and pyrolysis gasoline.

2. Discussion of the Prior Art

Cracked stocks which have a significant proportion of olefins and diolefins normally contained therein are usually upgraded by hydrogenation to form saturated hydrocarbons. The present process employs synthesis gas ($H_2$+CO) to convert olefinic material in such stock to methylated, saturated hydrocarbons. Two sequential reactions are involved; hydroformylation of the olefins to alcohols followed by hydrogenation to saturates. These reactions coupled with steam reforming of methane produce more liquid hydrocarbon than is produced by hydrogenation alone. The resultant product is lower in pour point, and higher in viscosity index (V.I.) and thermal stability. Since the hydroformylation/hydrogenation steps do not occur by carbonium ion mechanisms, even stocks with high basic nitrogen (e.g., shale oil) can be methylated and are therefore suitable for use as a feedstock in the disclosed invention. Although the current process is drawn from known chemical reactions, the improved product, operating requirements and resultant increased yields of usable products are the direct beneficial effects of the specific integrated process disclosed herein.

SUMMARY OF THE INVENTION

In accordance with this invention a suitable stock, for example catalytically dewaxed lube oil, can be upgraded by sequential hydroformylation/hydrogenation coupled with steam reforming. Since the process can be operated in the presence of nitrogen and arsenic compounds with little or no loss of carbon source as carbon dioxide, raw shale oil can also be used as a feedstock.

Hydroformylation of olefins with subsequent hydrogenation produces a mixture of paraffins with one more carbon than the parent hydrocarbon; terminal olefins generate a mixture of iso- and normal paraffins and non-terminal olefins generally yield isoparaffin products. Examples of the overall reactions are shown as follows.

Terminal Olefin:

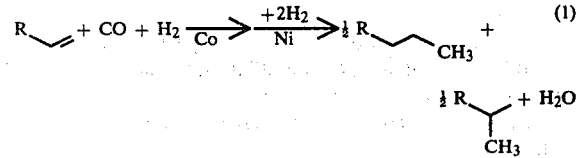

Non-Terminal Olefin:

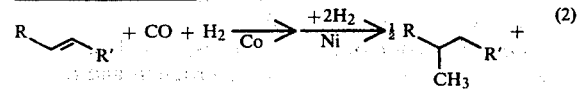

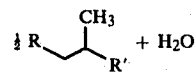

Isolated Diolefin:

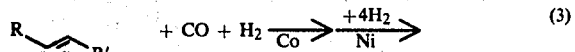

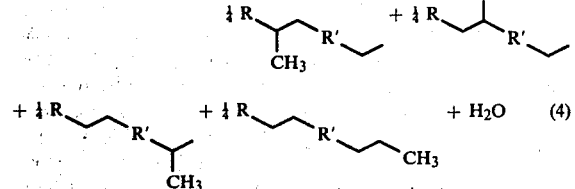

Conjugated Diolefin:

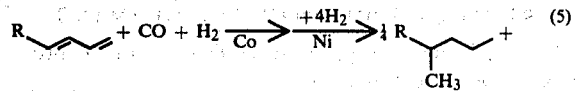

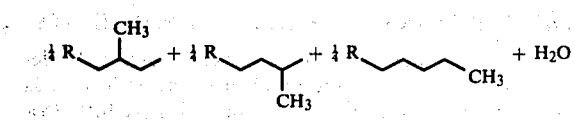

An ideal hydrocarbon reactant, i.e., one giving the maximum theoretical methylation, would be comprised only of olefins, i.e., mono- or diolefins. Diolefins usually undergo only single methylation, with minor production of multiply substituted material. When the hydroformylation/hydrogenation is coupled with steam reforming (SR), especially methane reforming, the overall reaction can be viewed as methylation of an olefin into a saturated hydrocarbon, e.g.,:

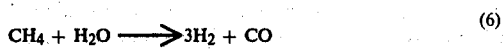

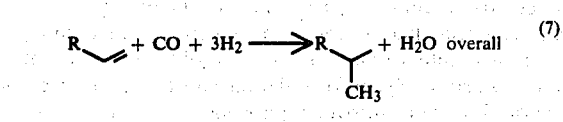

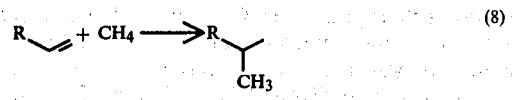

Process conditions differ significantly for reactions (6) and (7). For example, the steam reforming of methane [reaction (6)] would be run at 100 psig and 1800° F. at a methane-to-steam molar ratio of about 2, while the hydroformylation step would be run at conditions such as 300 psig and 400° F. Conditions for reaction (6) differ from normal commercial operation. Commercially, the desired product from the steam reforming of methane is a high $H_2$ content. Conditions, however, are selected such that significant conversion is achieved by the below-described water-gas shift reaction:

The current process accordingly uses conditions to minimize reaction (9). A portion of the synthesis gas produced would be diverted to the hydroformylation reactor, while the remaining synthesis gas would be further converted to a high $H_2$ product.

Briefly, the concept of the present invention is directed to a high efficiency process for alkylating olefins, with little or no loss of carbon source as carbon dioxide, utilizing synthesis gas with little or no hydrogen purification. The concept is of particular use for upgrading shale oil by eliminating its instability problem, increasing V.I. and lowering pour point despite the presence of nitrogen compounds while concomitantly reducing hydrogen consumption in the subsequent hydrotreating step because of the elimination of olefins and diolefins.

The process limits can vary within certain predetermined bounds. They are as follows: (1) in the hydroformylation step temperature ranges from 140° to 600° F.; pressure from 100 to 5500 psi; $CO/H_2$ ratio from 0.5 to 1.5.; and (2) in the hydrotreating/reduction step temperature ranges from 400° to 1000° F.; pressure from 500 to 2000 psi.

BRIEF DESCRIPTION OF THE DRAWING

The FIGURE is a typical flow diagram for the process of the present invention.

DESCRIPTION OF SPECIFIC EMBODIMENTS

The process described herein may be generally defined as one for upgrading cracked stocks in a process for alkylating olefins with no or substantially little loss of the carbon source as carbon dioxide, and a process wherein synthesis gas can be used in lieu of hydrogen, to significantly reduce the need for hydrogen purification and hydrogen consumption. The process comprises steam reforming of methane coupled with hydroformylation/hydrogenation.

The hydrotreating and hydroformylation catalysts may be selected from any number of suitable known catalysts for their intended purpose. Suitable hydroformylation catalysts include low to zero valence cobalt, rhodium, iridium, ruthenium or osmium, or the combination of any two or three of the above metals with or without a support. Suitable supports include, but are not limited to, alumina, silica, titania, magnesia, silica-alumina, boria, diatomaceous earth, bentonite, kaolinite, montmorillonite, or any combination of two or more of these materials. Hydroformylation can be in the presence or absence of nitrogen, phosphorus or alkali compounds or their promoters. Conventional hydrotreating catalysts are used wherein, for example, the hydrogenating component can be at least one member of the group consisting of Group VI and Group VIII metals in a form capable of promoting hydrogenation reaction, especially effective catalysts for the purposes of this invention are those comprising molybdenum and at least one member of the iron group metals. Preferred catalysts of this class are those containing about 2 to about 10 percent by weight cobalt and about 4 to about 20 percent by weight molybdenum, but other combinations of iron group metals and molybdenum such as iron, nickel and molybdenum, as well as combinations of nickel and molybdenum, cobalt and molybdenum, nickel and tungsten or other Group VI or Group VIII metals of the Period Table taken singly or in combination. The hydrogenating components of the catalysts of this invention can be employed in sulfided or unsulfided form.

The present invention is well suited for handling catalytically dewaxed lubes or fuels. Distillate dewaxing and lube dewaxing are acid catalyzed processes, and due to the acid induced formation of intermediate carbonium ions, the majority of product olefins therein will be non-terminal. Cleanup by hydroformylation/hydrogenation converts these olefinic compounds into branched paraffins, resulting in increased viscosity index (V.I.) at constant or lowered pour point. Shale oil, however, (see the Table for the properties of a typical oil produced from commercial retorting operations), is generally high in nitrogen (2 wt percent), and especially basic nitrogen, moderate in sulfur (0.7 wt percent), and high in olefins (30%–60%).

While the low aromatics content provides shale oil an excellent opportunity as a lube oil stock, the olefins contained therein create handling and storage instability problems due to polymerization and oxidation. Therefore, converting the olefins into branched paraffins will eliminate such problems and simultaneously lower the shale oil's pour point. However, conventional catalytic alkylation of olefins in shale oil would be inhibited by the large amount of basic nitrogen compounds. The nitrogen compounds have to be removed prior to any conventional processing because of the poisoning effect of the basic N compounds towards the catalyst. Unfortunately, in conventional catalytic shale oil denitrogenation, in addition to the N and S removal, substantial amounts of olefinic compounds are hydrogenated into saturated paraffins. Such conversion not only increases the pour point but also limits the potential use of the olefins. Since HDF is promoted by a base, the $SR/HDF/H_2$ process of the instant invention can be utilized to convert olefins in shale oils into branched alkanes in the presence of nitrogen compounds.

EXAMPLE 1

TABLE 1

| Typical Properties of a Shale Oil | |
|---|---|
| Gravity, °API | 21.7 |
| H, Wt. % | 11.49 |
| N, Wt. % | 2.20 |
| O, Wt. % | 1.40 |
| S, Wt. % | 0.69 |
| C, Wt. % | 84.21 |
| Ash, Wt. % | 0.01 |
| MW | 307 |
| Bromine No. | 45 |
| Avg. # olefinic bonds per molecule | 0.86 |

A shale oil having the properties defined in Table 1 above is processed in accordance with the process configuration described in the figure as follows:

Step 1. Steam reformer: Methane and/or natural gas and steam (ratio of C to steam equal to 2:1) are introduced into the steam reformers at T=1800° F. and 100 psig to generate syngas ($CO + H_2$).

2. CO, $H_2$ separator: COSORB process is used for CO and $H_2$ separation to produce $H_2$ and $CO/H_2 = 1:1$ mixture.

3. Hydroformylator: $CO/H_2$ (1:1) syngas is fed into the HDF reactor at 400° F. and 3000 psig. The catalyst is Co/Mo (cobalt/molybdenum) supported on a commercially available carrier, promoted by $K_2O$ or $Na_2O$.

4. Hydrotreater/$H_2$ reducer: Products are hydrotreated for shale oil or reduced by $H_2$ for dewaxed lube base oil at 2000 psi $H_2$ and 750° F. until complete formation or conversion of alkanes and $H_2O$ is obtained.

5. Separator: $H_2O$ is separated from products and recycled back to the steam reformer.

EXAMPLE 2

TABLE 2

| Typical Properties of FCC Light Fuel Oil | |
|---|---|
| Gravity, °API | 22.3 |
| S, wt % | 0.29 |
| N, wt % | 0.13 |
| Aniline point, °F | 72 |
| Bromine No. | 27 |
| Molecular Weight | 225 |
| Cetane Number | 20.5 |

An FCC light fuel oil having properties as shown in Table 2 is processed in a manner similar to that in Example 1. The resultant product is essentially free of olefins (Bromine number 0.5), and has a cetane number of 27. The improved cetane quality material can then be used as a diesel fuel blending component. The decreased olefin content also improves product stability, as observed by decreased gum and sediment formation.

EXAMPLE 3

TABLE 3

| Typical Properties of a Coker Gas Oil | |
|---|---|
| Gravity, °API | 16.4 |
| S, wt % | 1.33 |
| N, wt % | 0.85 |
| Basic N, wt % | 0.30 |
| Molecular Weight | 268 |
| Bromine No. | 24.2 |

A heavy coker gas oil, the properties of which are given in Table 3, is processed in a manner similar to Example 1. Elimination of the olefins via hydroformylation/hydrogen reduction decreases Conradson Carbon Residue (COR) and consequently improves the gas oil quality as a TCC or FCC feedstock.

The examples clearly illustrate the advantage of the embodied process over the prior art. For example, a feed stream as disclosed herein can be alkylated with synthesis gas, in the presence of basic nitrogen compounds, arsenic and sulfur compounds; the olefins therein saturated by a net reaction with methane; olefins, epoxides, carbonyl compounds carbonylated by the net reaction with methane and steam; and unsaturated compounds such as A=B—C—Z—H and A=-B—C—C—Z—H are cyclized by the net reaction with methane and steam where:

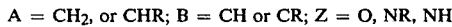

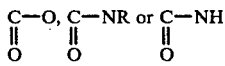

Further, eliminating the instability problem of the feeds, especially shale oil, increasing V.I. and lowering pour point in the presence of the aforementioned N compounds, makes possible the reduced hydrogen consumption in the overall process which is a highly significant commercial and economic advantage.

While the instant method has been described as detailed hereinabove, it will be appreciated by those skilled in the art that the invention is capable of broad utilization with a great variety of charge stocks and therefore the present process is not restricted to any particular details disclosed other than those specifically recited in the appended claims.

We claim:

1. A sequential process for upgrading hydrocarbon stocks selected from the group consisting of shale oil, catalytically dewaxed product, coker liquids, pyrolysis gasoline, FCC light cycle oil or other olefinic feedstock which comprises contacting said feedstock initially in a reaction zone in the presence of a hydroformylation catalyst under hydroformylation reaction conditions with synthesis gas having a ratio of carbon monoxide to hydrogen of about 1:1 for a time sufficient for the conversion of the olefinic compounds contained therein into branched alkanols, thereafter passing the effluent from said hydroformylation zone to a reaction zone containing a suitable hydrotreating/reduction catalyst under hydrotreating/reduction reaction conditions converting said effluent into saturates and recovering directly a branched hydrocarbon product having lower pour point, higher V.I. and improved thermal stability.

2. The process of claim 1 wherein the synthesis gas utilized in the hydroformylation zone is derived by steam reforming methane or natural gas as a first step in the integrated process described therein.

3. The process of claim 2 wherein the synthesis gas utilized in the hydroformylation zone is derived by steam reforming light hydrocarbons, selected from the boiling range of ethane to heavy naphthas, as said first step in said integrated process.

4. The process of claim 2 wherein the synthesis gas utilized in the hydroformylation zone is obtained by gasification of coal, coke, petroleum residuum, devolatilized coal, peat, tar sands bitumen, coal liquids residue, asphalt, or other carbonaceous material as said first step in said integrated process.

5. The process of claim 1 wherein water is separated from the final products and recycled back to the steam reformer as a final step in the integrated process described therein.

6. The process of claim 1 wherein the feed to the hydroformylation zone is raw or partially demetallized shale oil.

7. The process of claim 1 wherein the feed to the hydroformylation zone is catalytically dewaxed lube products.

8. The process of claim 1 comprising the following sequential steps
   (a) steam reformation of methane or natural gas in a carbon-to-steam ratio of about 2:1 under conditions suitable to generate synthesis gas;
   (b) separating carbon monoxide and hydrogen produced thereby to obtain $H_2$ and $CO/H_2$, said $CO/H_2$, in a 1:1 mixture admixing said mixture with a liquid hydrocarbyl cracked feedstock;
   (c) hydroformylating under catalytic reaction conditions the product of (b);
   (d) hydrotreating or reducing the effluent of (c) under suitable reaction conditions whereby the olefinic components of said feedstock are converted into saturated compounds; and
   (e) separating water from the products of (d) and recovering same, and recycling said water back to the steam reformer.

9. The process of claim 8 wherein the feedstock is selected from the group consisting of shale oil, catalytically dewaxed products, coker liquids, FCC light cycle oil or pyrolysis gasoline.

10. The process of claim 9 wherein the feedstock is shale oil.

11. The process of claim 9 wherein the feedstock is an olefinic liquid from a catalytic dewaxing process.

* * * * *